US011981530B2

United States Patent
Frushtick

(10) Patent No.: US 11,981,530 B2
(45) Date of Patent: May 14, 2024

(54) METHOD AND HYBRID DEVICE FOR FOLDING TEXTILE PRODUCTS OF DIFFERENT SIZES

(71) Applicant: Leonard Automatics, Inc., Denver, NC (US)

(72) Inventor: Jeffrey Neal Frushtick, Mooresville, NC (US)

(73) Assignee: Leonard Automatics, Inc., Denver, NC (US)

( * ) Notice: Subject to any disclaimer, the term of this patent is extended or adjusted under 35 U.S.C. 154(b) by 0 days.

(21) Appl. No.: 17/763,138

(22) PCT Filed: Dec. 3, 2021

(86) PCT No.: PCT/US2021/061804
§ 371 (c)(1),
(2) Date: Mar. 23, 2022

(87) PCT Pub. No.: WO2023/101687
PCT Pub. Date: Jun. 8, 2023

(65) Prior Publication Data
US 2024/0043237 A1    Feb. 8, 2024

(51) Int. Cl.
*B65H 45/16*       (2006.01)
*B65H 45/107*      (2006.01)
*D06F 89/00*       (2006.01)

(52) U.S. Cl.
CPC ........... *B65H 45/16* (2013.01); *B65H 45/107* (2013.01); *D06F 89/00* (2013.01);
(Continued)

(58) Field of Classification Search
CPC .... B65H 45/16; B65H 45/101; B65H 45/107; B65H 2301/541; B65H 2406/10;
(Continued)

(56) References Cited

U.S. PATENT DOCUMENTS 5,915,319 A * 6/1999 Price ................. D05B 35/04
112/141
8,402,681 B2 * 3/2013 Kusunoki ............ D06F 67/04
38/143
(Continued)

FOREIGN PATENT DOCUMENTS

CN       201592921 U     9/2010
JP      2008018100 A     1/2008
(Continued)

OTHER PUBLICATIONS

Patent Cooperation Treaty; International Search Report and Written Opinion of the International Searching Authority cited in application No. PCT/US21/61804 dated Feb. 23, 2022; 9 pages.

*Primary Examiner* — Leslie A Nicholson, III
(74) *Attorney, Agent, or Firm* — Shumaker, Loop & Kendrick, LLP; S. Alexander Long, Jr.; Lloyd J. Wilson

(57) ABSTRACT

A hybrid device for folding textile pieces of a plurality of sizes may include a frame supporting large and small textile piece folding portions. The hybrid device may include a selector configured to operate the hybrid device in either a large textile piece folding mode or a small piece folding mode. The hybrid device may include a large piece sensor beam configured to detect a size and a shape profile of a large size textile piece including regular and irregular shapes and sizes. The large textile piece folding portion may include a plurality of folding devices configured to impart a plurality of primary folds on the large size textile piece based on data received by the large piece sensor beam. The small textile piece folding portion may include a deflector for positioning and stacking a small size textile piece on a small piece draping bar.

15 Claims, 7 Drawing Sheets

(52) U.S. Cl.
CPC .... *B65H 2301/541* (2013.01); *B65H 2406/10* (2013.01); *B65H 2511/10* (2013.01); *B65H 2701/1924* (2013.01)

(58) Field of Classification Search
CPC ........ B65H 2511/10; B65H 2701/1924; D06F 89/00; D06F 89/02
USPC ......................................................... 270/32
See application file for complete search history.

(56) References Cited

U.S. PATENT DOCUMENTS 11,214,916 B2 * 1/2022 Maeshima ............. B65G 21/14
2019/0292718 A1 9/2019 Maeshima

FOREIGN PATENT DOCUMENTS

JP 2014188064 A 10/2014
WO 2012020136 A1 2/2012

* cited by examiner

METHOD AND HYBRID DEVICE FOR FOLDING TEXTILE PRODUCTS OF DIFFERENT SIZES

TECHNICAL FIELD AND BACKGROUND OF INVENTION

Textiles come in a variety of forms and may be woven and non-woven fabrics and sheet materials. Textiles may be made from various natural and/or synthetic materials including fibers which may include such materials as yarn, thread, silk, rayon, chemical fiber, short-hair silk, elastic silk, and metal wire among others. Textiles may include such manufactured goods as clothing, accessories, gloves, hats, bedding, table wear, carpets, rugs, and curtains among others. Such textiles may be formed into a variety of shapes including regular shapes such as round, square, and rectangle as may be seen in table linen and irregular shapes such as an apron having straps.

Textiles may be subjected to various finishing processes such as cleaning, pressing, ironing, dyeing, and printing, among others. Likewise, it may be desirable to have textiles folded and/or stacked prior to transport. Further, it may be desirable to have these processes take place after finishing and prior to transport. Further, it may be desirable to fold and/or stack both large and small textile pieces using a single machine and it may likewise be desirable to fold and/or stack multiple textile pieces simultaneously.

Accordingly, there exists a need the art for a device which may fold and/or stack textile pieces of a variety of sizes and shapes after they have been finished.

SUMMARY OF INVENTION

It is therefore an object of the present invention to provide a hybrid device for folding textile pieces of a plurality of sizes.

It is a further object of the present invention to provide a hybrid device that may be positioned in line after a textile finisher.

It is a further object of the present invention to provide a hybrid device that may be operated to fold small size pieces and also large size pieces.

It is a further object of the invention to provide a hybrid device that detects a size and/or shape profile of a large size piece and that imparts a plurality of primary folds on the large size piece based on the profile.

These and other objects and advantages of the invention are achieved by providing a hybrid device for folding textile pieces of a plurality of sizes having a frame supporting a large textile piece folding portion and a small textile piece folding portion. The hybrid device may have a selector configured to operate the hybrid device in either a large textile piece folding mode or a small piece folding mode. The hybrid may also have a large piece sensor beam configured to detect a profile of a large size textile piece. According to such a device, the large textile piece folding portion may include a plurality of folding devices configured to impart a plurality of primary folds on the large size textile piece. Also, the small textile piece folding portion may include a deflector for positioning and stacking a small size textile piece on a small piece draping bar.

According to another embodiment of the invention, a hybrid device may also include a plurality of small piece draping bars spaced apart on an endless chain, the endless chain configured to rotate in a carousel manner when the hybrid device is in the small piece folding mode.

According to another embodiment of the invention, a hybrid device may also include a counter configured to count the number of small textile pieces draped on each one of the plurality of small piece draping bars.

According to another embodiment of the invention, a hybrid device may operate such that each one of the plurality of folding devices includes a fold air jet and pinch rolls and wherein the large piece sensor beam communicates the profile of the large size textile piece to the plurality of folding devices such that the plurality of primary folds are positioned at desired locations on the large size textile piece based on the profile of the large size textile piece.

According to another embodiment of the invention, an infeed of the hybrid device may be positioned to transport both small textile pieces and large textile pieces from an outfeed of a textile finisher.

According to another embodiment of the invention, the large size textile piece may have an irregular shape.

According to another embodiment of the invention, a hybrid device may also include a first retractable infeed bed having an endless conveyor that transports textile pieces of a plurality of sizes from an outfeed of a textile finisher. The hybrid device may include a large piece retractable infeed bed having an endless conveyor, operating from an operating position wherein the hybrid device is configured to fold a plurality of large size textile pieces to a retracted position wherein the hybrid device is configured to fold a plurality of small size textile pieces. The hybrid device may further include a large piece sensor beam positioned above the large piece retractable infeed bed and configured to detect a profile of the large size textile pieces. The hybrid device may further include a plurality of large piece folding devices positioned in line at an exit end of the large piece retractable infeed bed. The hybrid device may further include a plurality of small piece draping bars spaced apart on an endless chain, the endless chain configured to rotate in a carousel manner. The hybrid device may further include a deflector positioned at an exit end of the first retractable infeed bed and configured to drape the small sized textile pieces at a midpoint of the small textile pieces across one small piece draping bar of the plurality of small piece draping bars.

According to another embodiment of the invention, when the large piece retractable infeed bed is in the operating position, the large piece retractable infeed bed receives the large size textile pieces from the first retractable infeed bed.

According to another embodiment of the invention, when the large piece retractable infeed bed is in the retracted position, the small textile pieces advance to the deflector and onto the plurality of small piece draping bars.

According to another embodiment of the invention, a hybrid device may also include a small textile piece counter configured to detect and to count a number of individual small textile pieces draped on each one of the small piece draping bars.

According to another embodiment of the invention, each one of the plurality of folding devices may include a fold air jet and pinch rolls and wherein the large piece sensor beam communicates the profile of the large size textile piece to the plurality of folding devices such that the plurality of primary folds are positioned at desired locations on the large size textile piece based on the profile of the large size textile piece.

According to another embodiment of the invention, a hybrid device may also include the large size textile piece may be one or more of a tablecloth, an apron, or a sheet, and the small size textile piece is a napkin, a pillowcase, or a towel. The small size may also be an apron or garment.

According to another embodiment of the invention, a method of folding textile pieces of a plurality of sizes may include the steps of providing a hybrid folding device for folding textile pieces of a plurality of sizes having: a frame supporting an infeed conveyor bed, a large textile piece folding portion, and a small textile piece folding portion; a selector configured to operate the hybrid device in either a large textile piece folding mode or a small textile piece folding mode; a large piece sensor beam configured to detect a profile of a large size textile piece; and a counter configured to count a plurality of small size textile pieces; wherein the large textile piece folding portion comprises a plurality of folding devices; and wherein the small textile piece folding portion comprises a deflector and plurality of small piece draping bars spaced apart on an endless chain. A further step may include positioning a textile finisher in communication with the infeed conveyor bed of the hybrid folding device. A further step may include selecting either the large textile piece folding mode or the small piece folding mode. A further step may include feeding the large textile piece into the textile finisher such that textile pieces exiting the textile finisher are fed directly into the hybrid folding device. Further steps may include detecting the profile of the large size textile piece and imparting the plurality of primary folds on the large size textile piece at primary fold locations based on the profile of the large size textile piece. A further step may include receiving folded large size textile pieces having a plurality of primary folds out of a discharge end of the hybrid folding device. A further step may include feeding the plurality of small textile size pieces into the textile finisher such that textile pieces exiting the textile finisher are fed directly into the hybrid folding machine. A further step may include draping the plurality of small textile size pieces via the defector onto the plurality of small piece draping bars. A further step may include counting the number of small textile size pieces on each one of the plurality of draping bars and rotating the endless chain once a predetermined number of small size textile pieces has been reached on one of the plurality of draping bars. A further step may include receiving a plurality of stacks of draped small size textile pieces from the hybrid folding device.

According to another embodiment of the invention, a further step may include providing a hybrid device wherein the hybrid folding device accommodates a plurality of lanes for simultaneously folding the plurality of small textile size pieces.

According to another embodiment of the invention, the hybrid device may accommodate up to six lanes for folding small textile size pieces. According to such an embodiment, five or six operators may feed small textile size pieces into the finisher and one or more operators may remove folded stacks of small textile size pieces from the hybrid device.

According to another embodiment of the invention, one or two operators may load feed large size textile pieces into the ironer. Where only one operator is utilized, an automatic spreader may be employed to capture corners. One or two operators may collect folded large size textile pieces from the hybrid devices. The one or two operators may further impart a further fold to the large size textile pieces.

According to another embodiment of the invention, an operator may manually configure the hybrid device for either large or small size textile pieces.

According to another embodiment of the invention, an operator may manually program the number of small sized textile pieces to be draped on individual small sized draping bars. According to one embodiment of the invention, the number of small sized textile pieces may be 5, 10, 15, 20, or 25.

According to another embodiment of the invention, an operator may manually program the location of each one of the plurality of folds imparted to the large size textile pieces based on the shape of the large size textile pieces.

According to another embodiment of the invention, the sensor beam may comprise a plurality of photo eyes that shape and size of the large size textile piece. The photo eyes may detect leading and trailing ends and/or may detect square, round, and/or irregular sizes. The photo eye detection may allow the hybrid device to make adjustments to the folds.

According to one aspect of the invention, the hybrid device may significantly increase production speed for the small size textile pieces. That is, the small size textile pieces may be folded with the draping bar in a parallel orientation with the width of the hybrid device. Operators of the hybrid device may load up to 1500 small size pieces per hour in each lane of the hybrid device. A single operator may be positioned at the discharge end of the hybrid device and the single operator may remove all of the accumulated stacks of small size textile pieces. The single operator may move processed small size textile pieces to packaging or the next processing step.

According to another aspect of the hybrid device, the hybrid device may additionally allow for the primary folding of the large size textile pieces. By being configurable for both small and large size textile pieces, the need for a bypass table and multiple different processing machines for each size textile piece is eliminated. Accordingly, the hybrid device is characterized by a lack of any bypass table. That is, the invention specifically excludes any bypass table.

According to another aspect of the hybrid device, the hybrid device provides for high speed accumulation of small size textile pieces and also provides the application of primary folds, and also, optionally, secondary and/or tertiary folds, into the large size textile pieces.

According to another aspect of the invention, the hybrid device may be deployed in facilities that process textiles for more banquet and food service industries. According to such an environment, the hybrid device may process both small size textile pieces in the form of napkins and also large size textile pieces in the form of table top cloths. According to such an embodiment, the ratio between napkins to table top cloths may be significant and, therefore, production speeds of the hybrid device may be configured to optimize processing according to the desired ratio of napkins to table top cloths. That is, the device can be programed to optimize the processing of both napkins and table top cloths depending on the ratio of napkins to table top cloths used in a particular setting.

BRIEF DESCRIPTION OF THE DRAWING FIGURES

The present invention is best understood when the following detailed description of the invention is read with reference to the accompanying drawings, in which:

FIG. 1 is a front perspective view of the hybrid device;
FIG. 2 is a rear perspective of the hybrid device;
FIG. 3 is a cutaway view of the hybrid device configured for folding large size textile pieces;
FIG. 4 is a cutaway view of the hybrid device configured for folding large size textile pieces;

DETAILED DESCRIPTION

Figure 1:
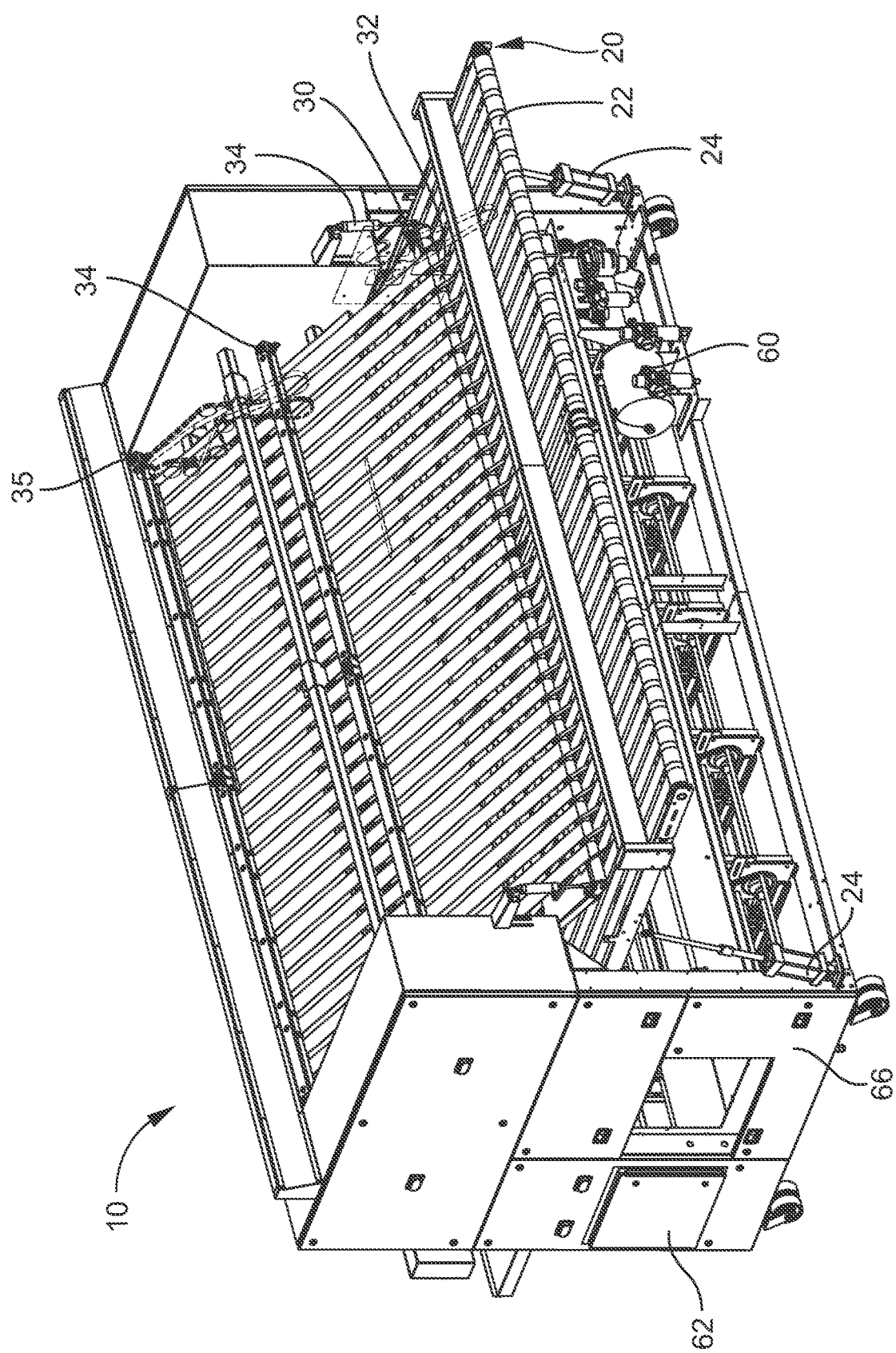
Figure 2:
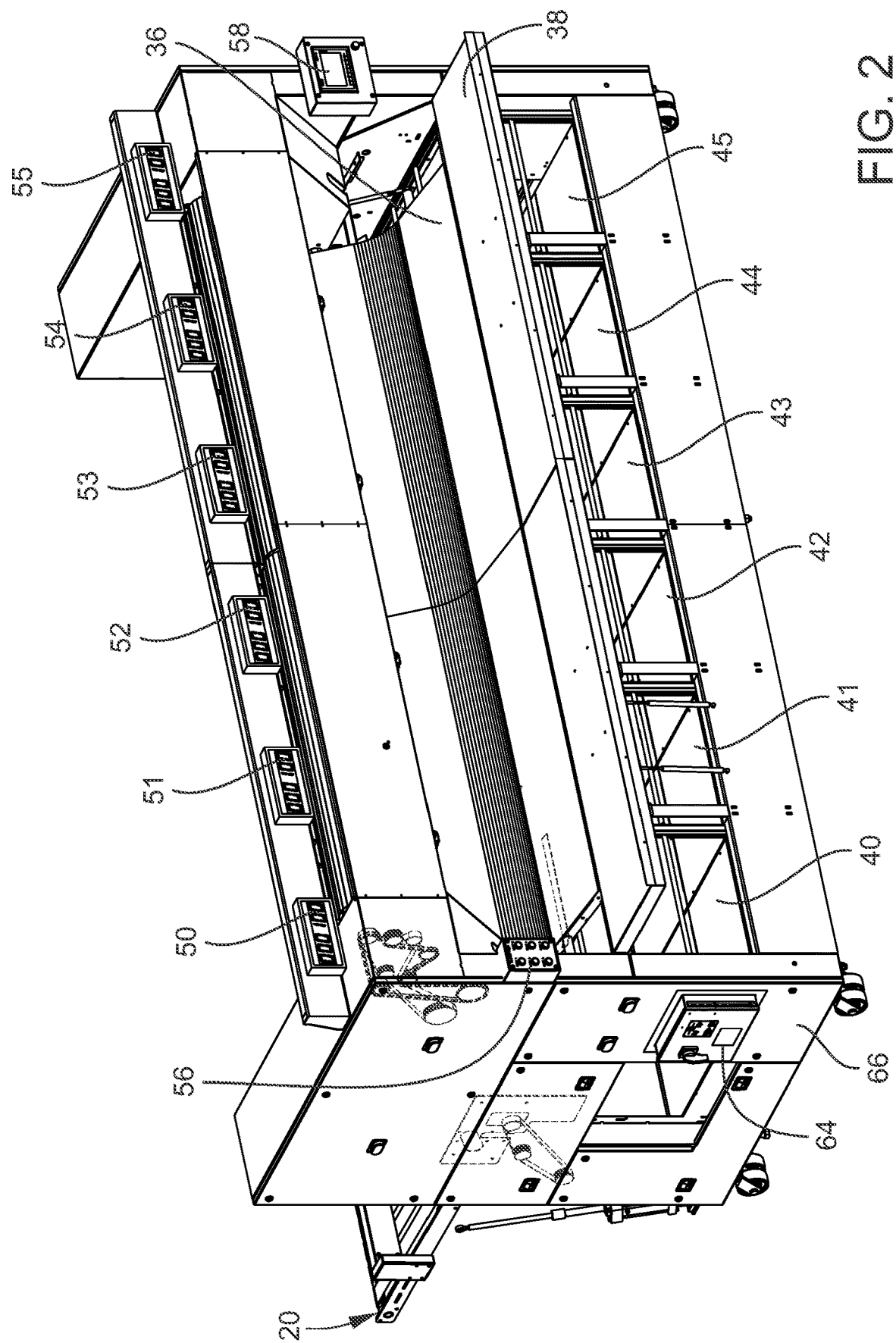
Figure 3:
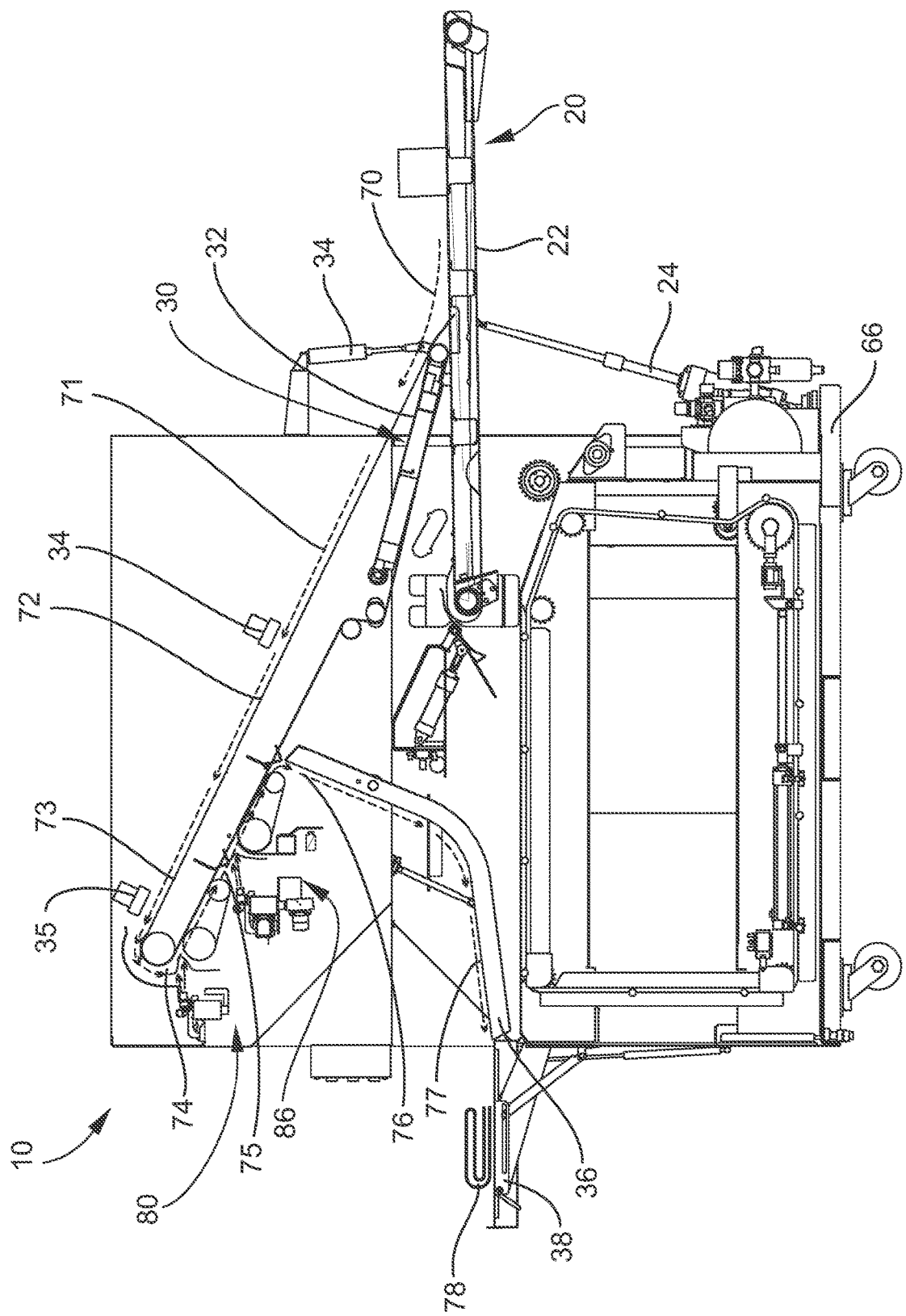
Figure 4:
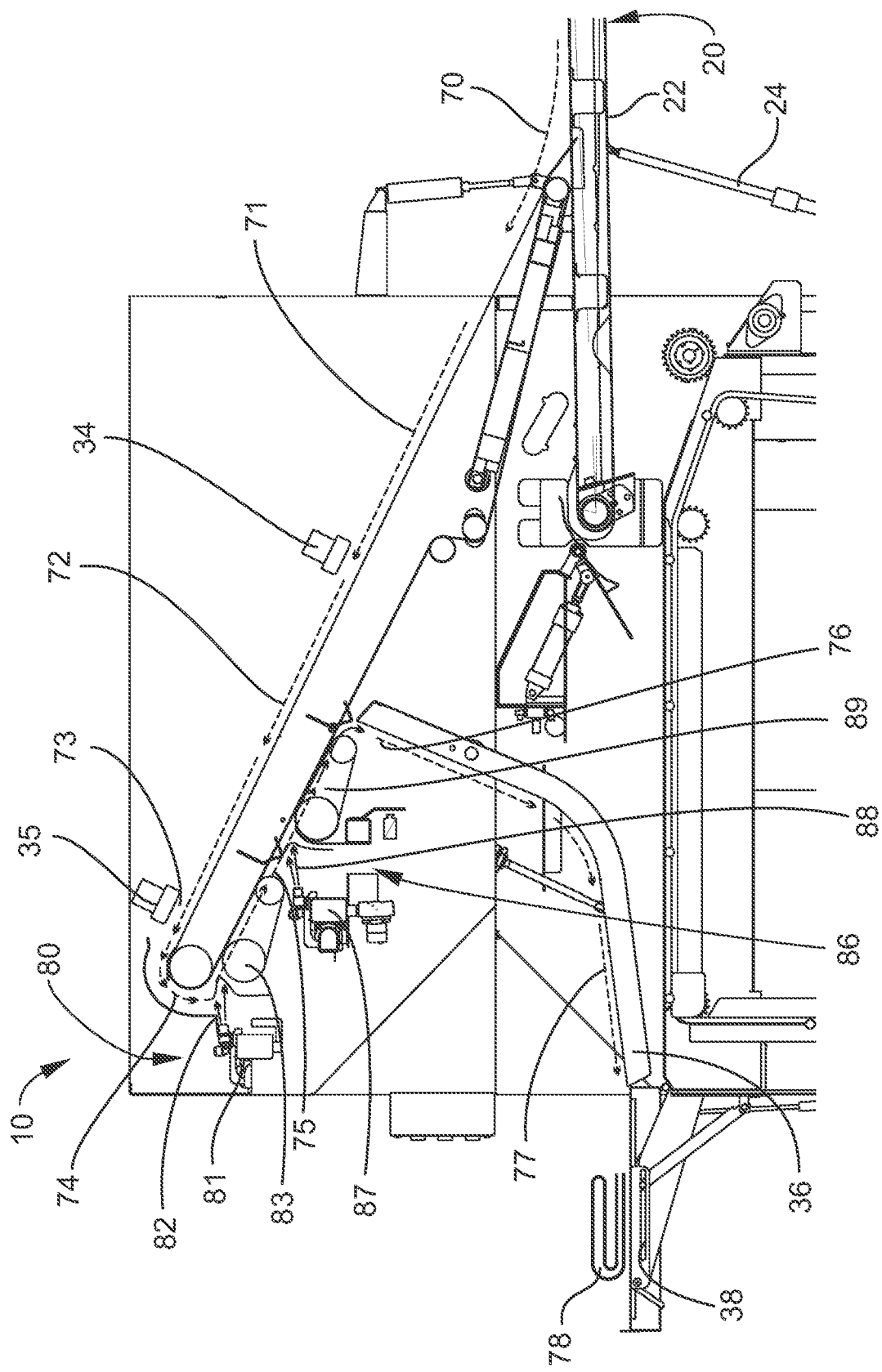
Figure 5:
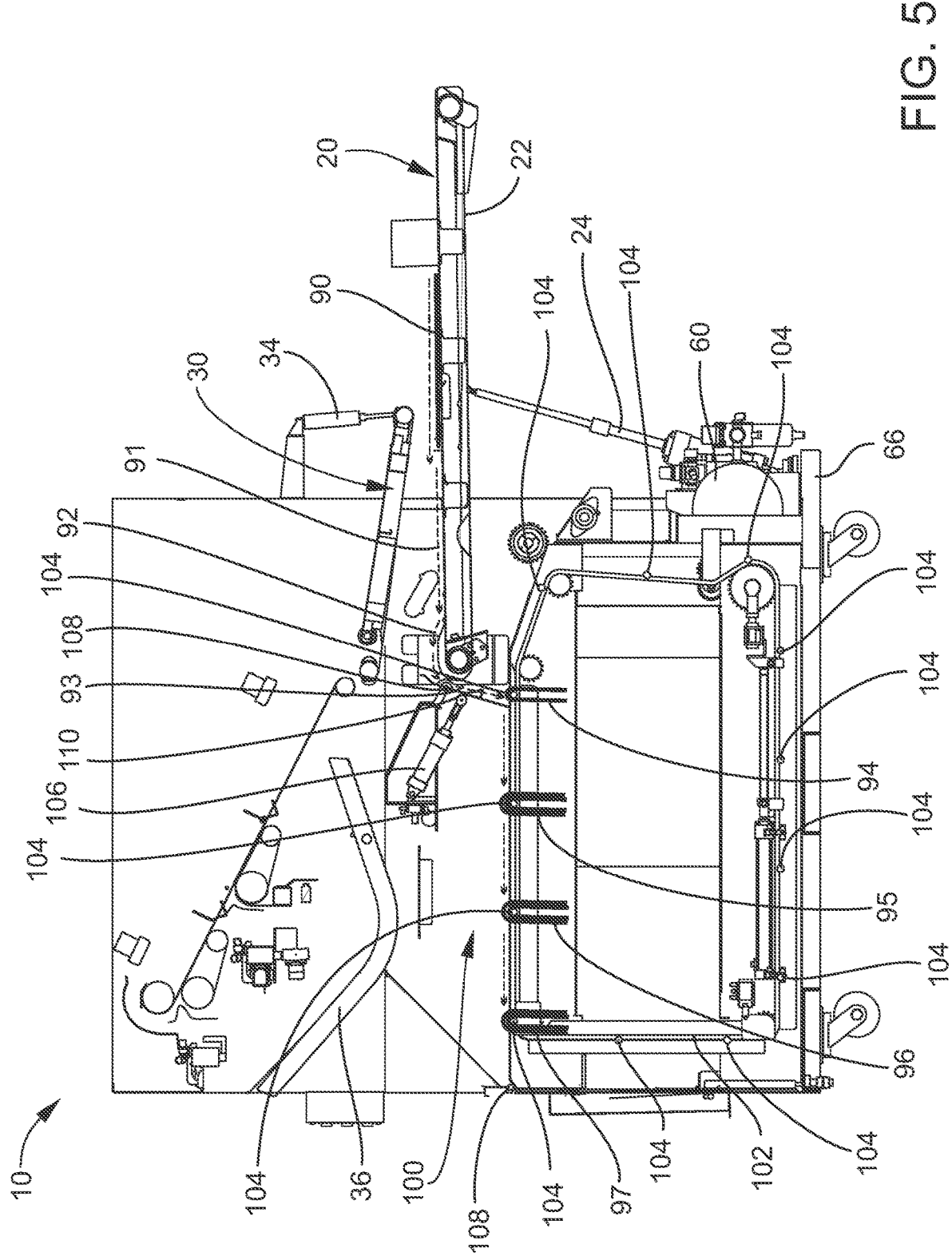
FIG. 5 is a cutaway view of the hybrid device configured for folding small size textile pieces.
Figure 6:
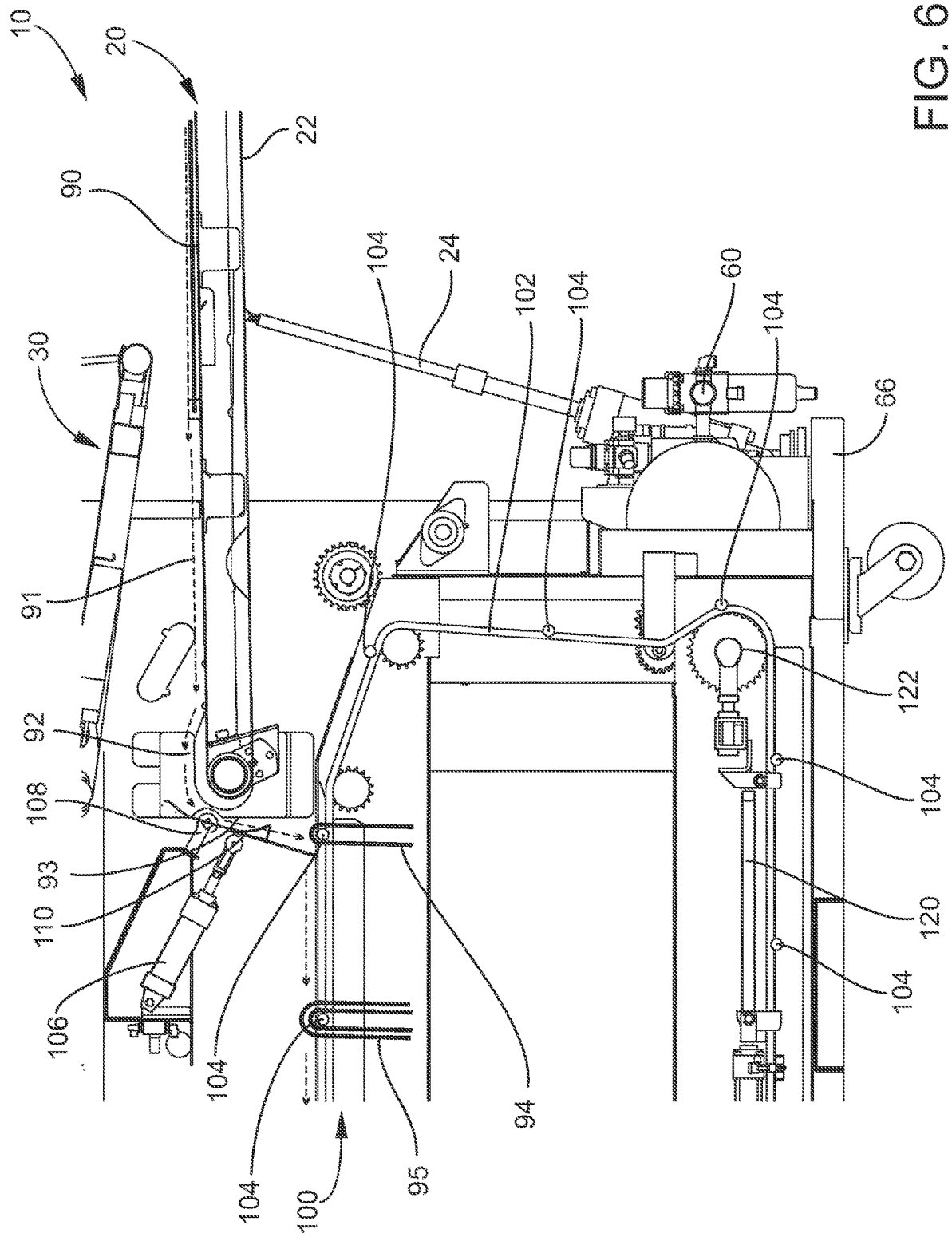
FIG. 6 is a cutaway view of the hybrid device configured for folding small size textile pieces.
Figure 7:
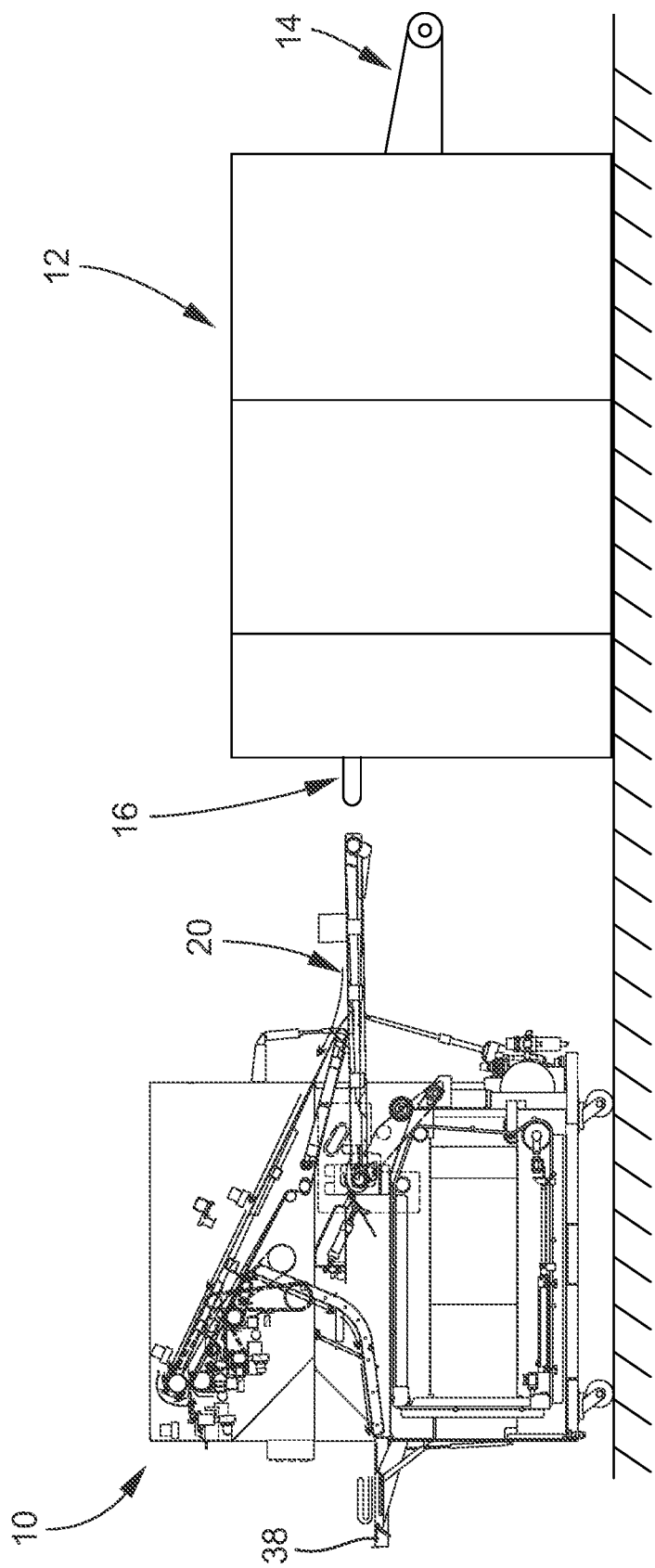
FIG. 7 is a partial cutaway side view of the hybrid device arranged adjacent a textile finisher.

Referring now to the drawings, FIGS. 1-7 show a hybrid device 10, according to the present invention, for folding and/or stacking a plurality of textile pieces of a plurality of shape and size profiles. In particular, FIGS. 1 and 2 show front and rear perspective views of the fully assembled hybrid device 10. FIGS. 3 and 4 show cutaway views where the hybrid device 10 has been configured for folding large size textile pieces. As will be further discussed below, these figures highlight how the large size textile pieces progress through the hybrid device and are folded. FIGS. 5 and 6 show cutaway views where the hybrid device 10 has been configured for folding small size textile pieces. As will be further discussed below, these figures highlight how the small size textile pieces progress through the hybrid device 10 and are folded and stacked. Finally, FIG. 7 shows an exemplary use wherein the hybrid device 10 is positioned adjacent a textile finisher 12 such as an ironer.

As shown in FIGS. 1 and 2, the hybrid device 10 has a frame 66 which supports the various components of the hybrid device 10. The hybrid device 10 utilizes both low and high voltage which are enclosed via low voltage enclosure 62 and high voltage enclosure 64. Textile product that requires folding and/or stacking enters hybrid device 10 via infeed bed 20 on the endless conveyor 22. The infeed bed 20 is retractable as assisted by pneumatic cylinders 24. Various components of the hybrid device 10 utilize compressed air which is supplied via incoming air treatment 60. Controller 58 for configuring the hybrid device 10 and selecting operating conditions is positioned on a rear side of the hybrid device 10.

When it is desirable to fold large size textile pieces, the hybrid device 10 is configured as shown in FIGS. 1 and 2 such that a large piece retractable infeed bed 30 is utilized. The large piece retractable infeed bed 30 has an endless conveyor 32. The large piece retractable infeed bed 30 is retractable via lifting cylinder 34. Large piece sensor beams 34, 35 used to detect the size and shape profile of the large size textile pieces. As will be discussed below, this profile, detected by the sensor beams 34, 35 is used by the hybrid device 10 to impart a plurality of folds on the large size textile pieces. The large size textile pieces exit the hybrid device 10 via retractable discharge chute 36.

The hybrid device 10 may be configurable to operate with a single lane for large size textile pieces or in a two or more lane mode for small size textile. By way of an example, if a textile piece is 90 inches or larger, the hybrid device 10 may be configured to process larger size textile pieces in a single lane. Likewise, if a textile piece is 72 inches or smaller, the hybrid device 10 may be configured to process small textile pieces in two or more lanes such that each piece is folded in a separate, parallel lanes.

Also visible in FIG. 2 are elements which are utilized in the folding and stacking of small size textile pieces. For instance, when the hybrid device 10 has been configured to fold small size textile pieces, it folds multiple pieces simultaneously. That is, the small size textile pieces progress through the hybrid device 10 in parallel lanes 40, 41, 42, 43, 44, and 45. The number of small size textile pieces which progress through the hybrid device 10 are counted via counters 50, 51, 52, 53, 54, and 55. Each of the respective counters 50, 51, 52, 53, 54, and 55 is paired with a respective lane 40, 41, 42, 43, 44, and 45. Further, each counter may be controlled and reset via counter reset buttons 56.

Referring now specifically to FIGS. 3 and 4, the method of folding large size textile pieces using the hybrid device 10 is shown and described. Reference numerals 70, 71, 72, 73, 74, 75, 76, and 77 identify the path—shown with arrows and broken lines—that the large size textile pieces take from the beginning at the infeed bed 20 all the way to the retractable outfeed table 38 where the large size textile pieces are folded 78. According to one embodiment, the hybrid device 10 is configured to fold large size textile pieces. A textile finisher 12 as shown in FIG. 7, may be positioned adjacent the hybrid device 10. As large size textile pieces exit the textile finisher 12, they enter the hybrid device 10 via infeed bed 20. Endless conveyor 24 carries the large size textile pieces laterally into the hybrid device 10. As shown at reference numeral 70, the large size textile pieces are diverted from the infeed bed 20 by large piece retractable infeed bed 30 using the endless conveyor of the large piece retractable infeed bed 32.

As shown at reference numeral 71, the large size textile pieces proceed up the large piece retractable infeed bed 30 and pass under the large piece sensor beam 34. Large piece sensor beam 34 has a plurality of photo eyes which detect the profile of the large size textile pieces. This profile may include size and shape of the large size textile pieces. For instance, the large size textile pieces may have a square or rectangle shape such as a tablecloth or a bed sheet. Or, the large size textile pieces may have an irregular shape such as an apron with straps. As shown at reference numeral 72, after passed under one of the large piece sensor beams 34, the large size textile piece continues up the large piece retractable infeed bed 30. The large size textile pieces then pass under a second large piece sensor beam 35 as shown at reference numeral 73.

As shown at reference numeral 74, as the large size textile pieces round the edge of the large piece retractable infeed bed 30, the large size textile pieces are subjected to a first fold by a first folding device 81. First folding device 80 includes first air jet tube 81 which projects a stream 82 of compressed air from an air reservoir (not shown). The control of the stream 82 may be projected via appropriate valving. The valving is controlled via a computer (not shown) which uses the large size textile piece profile detected by the large piece sensor beams 34, 35 such that the first fold is precisely positioned. As the air jet tube 81 projects the stream 82 of compressed air, the large size textile piece is pinched into a first large piece fold nip 83 which includes a belt actuated by a pair of rollers. As shown in reference numeral 75, as the air stream 82 contacts the large size textile piece, the fold of the piece is pinched between the first large piece fold nip 83 and the endless belt of 32 of the large piece retractable infeed bed 30.

As shown at reference numeral 76, second folding device 86 operates much like the first folding device 80. That is, as the large size textile pieces exit the first folding device 81, a second air jet tube 87 projects a stream 88 of compressed air from a second air reservoir (not shown). The control of the stream 88 may be projected via appropriate valving. The valving is controlled via a computer (not shown) which uses the large size textile piece profile detected by the large piece sensor beams 34, 35 such that the second fold is precisely positioned. As the air jet tube 87 projects the stream 88 of compressed air, the large size textile piece is pinched into a second large piece fold nip 89 which includes a belt actuated by a pair of rollers. As the air stream 88 contacts the large size textile piece, the second fold of the piece is pinched between the second large piece fold nip 89 and the endless belt of 32 of the large piece retractable infeed bed 30. While the embodiment shown in the figures includes first and second folding devices 80, 86, one of skill in the art will recognize that additional folding devices could be utilized in order to impart additional folds on the large size textile piece. In particular, the invention expressly contemplates first, second, and third folds.

After the final fold has been imparted on the large size textile piece, as shown at reference numeral 77, the folded large size textile piece 78 slides down the retractable discharge chute 36 and onto the retractable outfeed table 38. Once on the retractable outfeed table, an operator may, optionally, impart a further fold manually. The folded large size textile piece may then be placed in appropriate packaging for transport.

Referring now specifically to FIGS. 5 and 6, the method of folding small size textile pieces using the hybrid device 10 is shown and described. Reference numerals 90, 91, 92, 93, 94, 95, 96, and 97 identify the path—shown with arrows and broken lines and stacked/draped textile pieces—that the small size textile pieces take from the beginning at the infeed bed 20 all the way to the exit end 108 where the small size textile pieces which have been folded and stacked are manually removed. According to one embodiment, the hybrid device 10 is configured to fold small size textile pieces. A textile finisher 12 as shown in FIG. 7, may be positioned adjacent the hybrid device 10. As small size textile pieces exit the textile finisher 12, they enter the hybrid device 10 via infeed bed 20. Endless conveyor 24 carries the large size textile pieces laterally into the hybrid device 10. When configured for folding and stacking small size textile pieces, the large piece retractable infeed bed 30 has been retracted and lifted away from the infeed bed 20 via cylinder 34. This lifting allows small size textile pieces to bypass the large piece retractable infeed bed and continue into the hybrid device 10 for folding and stacking. Further, when configured for folding and stacking small size textile pieces, the chute 36 has been lifted away as well and the retractable outfeed table 38 has been retracted so that the folded and stacked small size textile pieces may be accessed by operators.

As shown at reference numeral 90, small size textile pieces enter the hybrid device 10 on infeed bed 20. The endless conveyor 22 carries the small size textile pieces past the raised retractable infeed bed 30 as shown at reference numeral 91. As shown at reference numerals 92 and 93, the small size textile pieces are subjected to deflection by deflector 110. The deflector 110 is actuated by cylinder 106. The small size textile pieces bend past knob 108 and downward onto draping bar 104 as shown at numeral 94. As the small size textile piece is proceeding to the draping bar, when a midpoint of the small size textile piece has been reached, the cylinder 106 actuates the deflector 110 which imparts a fold across the other side of the draping bar 104 such that the midpoint of the small size textile piece sits atop the draping bar. Successive small size textile pieces advance on the infeed bed 20 and are similarly deflected across the draping bar. A counter counts each small size textile piece. When a predetermined count has been reached, the draping bar 104 advances such that small size textile pieces begin to be stacked in like manner on the next, empty draping bar 104.

As shown in FIGS. 5 and 6, a plurality of draping bars 104 are arranged in a carousel 100 that rotates in a counterclockwise path. According to this path, small size textile pieces are stacked and draped as shown at the position of numeral 94 and advance when the predetermined count has been reached as shown in numerals 95 and 96. As shown at numeral 97, the stack of small size textile pieces are in position to be removed from the hybrid device 10 at end 108.

Carousel 100 includes the plurality of draping bars 104 which are attached to endless member 102. Endless member 102 is motivated by wheels 122 and endless member 102 is held in position by tensioner 120.

The device and method of folding small size textile pieces, which is shown in FIGS. 5 and 6, may be replicated/deployed in hybrid device to accommodate multiple parallel lanes 40, 41, 42, 43, 44, and 45 as shown in FIG. 2. Such a configuration will allow efficient, simultaneous folding and stacking of many small size textile pieces.

Referring to FIG. 7, as discussed above, a textile finisher 12, such as an ironer, may be positioned in-line with the hybrid device 10. Both large and small size textile pieces may be fed into an infeed 14 of the textile finisher 12. As the large and small size textile pieces exit the finisher at outfeed end 16, they are fed directly onto the infeed 20 of the hybrid device 10.

The device and method shown in FIGS. 1-7 may allow for improved efficiencies. For example, when configured for folding/stacking small size textile pieces, the hybrid device 10 may require one operator per lane at the infeed end 14 of the textile finisher 12 and one or two operators at the exit end 104 of the hybrid device 10. Likewise, when configured for folding large size textile pieces, the hybrid device 10 may require only one or two operators at the infeed end 14 of the textile finisher 12 and only one operate at the outfeed table 38. An automatic spreader device may be utilized in conjunction with large size textile pieces when feeding large size textile pieces into the infeed end 14 of the textile finisher 12.

The foregoing has described a hybrid device 10 for folding and/or stacking a plurality of textile pieces of a plurality of shape and size profiles. While specific embodiments of the present invention have been described, it will be apparent to those skilled in the art that various modifications thereto can be made without departing from the spirit and scope of the invention. Accordingly, the foregoing description of the invention and the best mode for practicing the invention are provided for the purpose of illustration only and not for the purpose of limitation.

What is claimed is:

1. A hybrid device for folding textile pieces of a plurality of sizes comprising:
    a) a frame supporting a large textile piece folding portion and a small textile piece folding portion;
    b) a selector configured to operate the hybrid device in either a large textile piece folding mode or a small piece folding mode; and
    c) a large piece sensor beam configured to detect a profile of a large size textile piece;
        wherein the large textile piece folding portion comprises a plurality of folding devices configured to impart a plurality of primary folds on the large size textile piece; and
        wherein the small textile piece folding portion comprises a deflector for positioning and stacking a small size textile piece on a small piece draping bar.

2. The hybrid device of claim 1 further comprising a plurality of small piece draping bars spaced apart on an endless chain, the endless chain configured to rotate in a carousel manner when the hybrid device is in the small piece folding mode.

3. The hybrid device of claim 2 further comprising a counter configured to count the number of small textile pieces draped on each one of the plurality of small piece draping bars.

4. The hybrid device of claim 1 wherein each one of the plurality of folding devices comprises a fold air jet and pinch rolls and wherein the large piece sensor beam communicates the profile of the large size textile piece to the plurality of folding devices such that the plurality of primary folds are positioned at desired locations on the large size textile piece based on the profile of the large size textile piece.

5. The hybrid device of claim 1 wherein an infeed of the hybrid device is positioned to transport both small textile pieces and large textile pieces from an outfeed of a textile finisher.

6. The hybrid device of claim 1 wherein the large size textile piece has an irregular shape.

7. A hybrid device for folding textile pieces of a plurality of sizes comprising:
   a) a first retractable infeed bed having an endless conveyor that transports textile pieces of a plurality of sizes from an outfeed of a textile finisher;
   b) a large piece retractable infeed bed having an endless conveyor, operating from an operating position wherein the hybrid device is configured to fold a plurality of large size textile pieces to a retracted position wherein the hybrid device is configured to fold a plurality of small size textile pieces;
   c) a large piece sensor beam positioned above the large piece retractable infeed bed and configured to detect a profile of the large size textile pieces;
   d) a plurality of large piece folding devices positioned in line at an exit end of the large piece retractable infeed bed;
   e) a plurality of small piece draping bars spaced apart on an endless chain, the endless chain configured to rotate in a carousel manner; and
   f) a deflector positioned at an exit end of the first retractable infeed bed and configured to drape the small sized textile pieces at a midpoint of the small textile pieces across one small piece draping bar of the plurality of small piece draping bars.

8. The hybrid device of claim 7 wherein, when the large piece retractable infeed bed is in the operating position, the large piece retractable infeed bed receives the large size textile pieces from the first retractable infeed bed.

9. The hybrid device of claim 7 wherein, when the large piece retractable infeed bed is in the retracted position, the small textile pieces advance to the deflector and onto the plurality of small piece draping bars.

10. The hybrid device of claim 7 further comprising a small textile piece counter configured to detect and to count a number of individual small textile pieces draped on each one of the small piece draping bars.

11. The hybrid device of claim 7 wherein each one of the plurality of folding devices comprises a fold air jet and pinch rolls and wherein the large piece sensor beam communicates the profile of the large size textile piece to the plurality of folding devices such that the plurality of primary folds are positioned at desired locations on the large size textile piece based on the profile of the large size textile piece.

12. The hybrid device of claim 7 wherein the large size textile piece is one or more of a tablecloth, an apron, or a sheet, and the small size textile piece is a napkin, a pillowcase, or a towel.

13. A method of folding textile pieces of a plurality of sizes comprising the steps of:
   a) providing a hybrid folding device for folding textile pieces of a plurality of sizes having:
      i. a frame supporting an infeed conveyor bed, a large textile piece folding portion, and a small textile piece folding portion;
      ii. a selector configured to operate the hybrid device in either a large textile piece folding mode or a small textile piece folding mode;
      iii. a large piece sensor beam configured to detect a profile of a large size textile piece; and
      iv. a counter configured to count a plurality of small size textile pieces;
         wherein the large textile piece folding portion comprises a plurality of folding devices; and
         wherein the small textile piece folding portion comprises a deflector and plurality of small piece draping bars spaced apart on an endless chain;
   b) positioning a textile finisher in communication with the infeed conveyor bed of the hybrid folding device;
   c) selecting either the large textile piece folding mode or the small piece folding mode;
   d) feeding the large textile piece into the textile finisher such that textile pieces exiting the textile finisher are fed directly into the hybrid folding device;
   e) detecting the profile of the large size textile piece, imparting the plurality of primary folds on the large size textile piece at primary fold locations based on the profile of the large size textile piece;
   f) receiving folded large size textile pieces having a plurality of primary folds out of a discharge end of the hybrid folding device;
   g) feeding the plurality of small textile size pieces into the textile finisher such that textile pieces exiting the textile finisher are fed directly into the hybrid folding machine;
   h) draping the plurality of small textile size pieces via the defector onto the plurality of small piece draping bars;
   i) counting the number of small textile size pieces on each one of the plurality of draping bars and rotating the endless chain once a predetermined number of small size textile pieces has been reached on one of the plurality of draping bars; and
   j) receiving a plurality of stacks of draped small size textile pieces from the hybrid folding device.

14. The method of folding textile pieces of claim 13 wherein the hybrid folding device accommodates a plurality of lanes for simultaneously folding the plurality of small textile size pieces.

15. The method of folding textile pieces of claim 13 wherein the large size textile piece is one or more of a tablecloth, an apron, or a sheet, and the small size textile piece is a napkin, a pillowcase, or a towel.

* * * * *